US010355744B2

(12) United States Patent
Yamaguchi

(10) Patent No.: US 10,355,744 B2
(45) Date of Patent: Jul. 16, 2019

(54) FEED LINE BRANCHING APPARATUS AND FEED LINE BRANCHING METHOD

(71) Applicant: NEC CORPORATION, Tokyo (JP)

(72) Inventor: Shohei Yamaguchi, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/531,528

(22) PCT Filed: Dec. 7, 2015

(86) PCT No.: PCT/JP2015/006067
§ 371 (c)(1),
(2) Date: May 30, 2017

(87) PCT Pub. No.: WO2016/092806
PCT Pub. Date: Jun. 16, 2016

(65) Prior Publication Data
US 2017/0331516 A1    Nov. 16, 2017

(30) Foreign Application Priority Data
Dec. 10, 2014 (JP) .................... 2014-249983

(51) Int. Cl.
*H04B 3/44* (2006.01)
*H02J 4/00* (2006.01)

(52) U.S. Cl.
CPC . *H04B 3/44* (2013.01); *H02J 4/00* (2013.01)

(58) Field of Classification Search
CPC ................ H04B 3/44; H04B 3/00; H02J 4/00
See application file for complete search history.

(56) References Cited

U.S. PATENT DOCUMENTS 3,644,787 A * 2/1972 Hamilton ................ H02H 3/24
                                                                307/100
5,214,312 A * 5/1993 Inoue ...................... H04B 3/44
                                                                307/112

(Continued)

FOREIGN PATENT DOCUMENTS

JP    63-260324 A    10/1988
JP    1-289323 A    11/1989

(Continued)

OTHER PUBLICATIONS

International Search Report of PCT/JP2015/006067, dated Jan. 12, 2016. [PCT/ISA/210].

(Continued)

*Primary Examiner* — Jean B Corrielus
(74) *Attorney, Agent, or Firm* — Sughrue Mion, PLLC

(57) ABSTRACT

Provided is a feedline branching apparatus that makes it possible for additional submarine cables to be installed easily, and with which cost increases can be restricted. For these purposes, the feedline branching apparatus comprises a branching unit and an earth unit. First, second and third terminal stations are connected to the branching unit via first, second and third cables, respectively. When the first and second cables are normal, the branching unit connects a feedline of the first cable to a feedline of the second cable, thereby forming a feedline using a first current. If one of the first and second cables is faulty, the branching unit grounds the feedline of the one of the first and second cables, while connecting the feedline of the other cable to the earth unit. The earth unit grounds a feedline of the third cable, thereby forming a feedline using a second current. When the feedline of the other cable is connected to the earth unit from the branching unit, the earth unit grounds the feedline of the (Continued)

other cable, thereby forming a feedline using the first current.

10 Claims, 7 Drawing Sheets

(56) References Cited

U.S. PATENT DOCUMENTS

| | | | |
|---|---|---|---|
| 5,334,879 A | 8/1994 | Inoue et al. | |
| 5,358,426 A * | 10/1994 | Henschen | B23K 3/0475 439/497 |
| 5,491,368 A * | 2/1996 | Yamamoto | H04B 3/44 307/113 |
| 5,644,466 A * | 7/1997 | Ohta | H04B 3/44 307/38 |
| 5,675,676 A * | 10/1997 | Yamashita | H04J 14/0201 385/24 |
| 6,163,084 A * | 12/2000 | Yamaguchi | H04B 3/02 307/38 |
| 6,714,394 B1 * | 3/2004 | Kumayasu | H04B 10/806 361/62 |
| 9,143,845 B2 * | 9/2015 | Aida | H04B 3/44 |
| 2010/0308939 A1 * | 12/2010 | Kurs | H02J 5/005 333/219.2 |
| 2014/0103739 A1 * | 4/2014 | Takigawa | H02J 4/00 307/112 |

FOREIGN PATENT DOCUMENTS

| | | |
|---|---|---|
| JP | 3-76322 A | 4/1991 |
| JP | 4-245816 A | 9/1992 |
| JP | 4-256225 A | 9/1992 |
| JP | 9-181654 A | 7/1997 |
| JP | 11-510350 A | 9/1999 |
| JP | 2001-203610 A | 7/2001 |
| JP | 2010-206635 A | 9/2010 |

OTHER PUBLICATIONS

Written Opinion of PCT/JP2015/006067, dated Jan. 12, 2016. [PCT/ISA/237].
Communication dated May 3, 2018 from the European Patent Office in counterpart Application No. 15867303.8.

* cited by examiner

FEED LINE BRANCHING APPARATUS AND FEED LINE BRANCHING METHOD

CROSS REFERENCE TO RELATED APPLICATIONS

This application is a National Stage of International Application No. PCT/JP2015/006067 filed Dec. 7, 2015, claiming priority based on Japanese Patent Application No. 2014-249983, filed Dec. 10, 2014, the contents of all of which are incorporated herein by reference in their entirety.

TECHNICAL FIELD

The present invention relates to feed line branching apparatuses and feed line branching methods and, in particular, to a feed line branching apparatus and a feed line branching method for branching a feed line from a submarine cable.

BACKGROUND ART

In submarine cable systems, submarine branching apparatuses are used for branching a submarine cable into a plurality of lines. In general, submarine branching apparatuses and submarine repeaters installed halfway through submarine cables are powered by constant current power source of land stations.

FIG. 6 is a block diagram illustrating a configuration of a common submarine cable system 900. The submarine cable system 900 includes a trunk station 1, a trunk station 2, a branch station 3 and a submarine branching apparatus 90. The trunk stations 1, 2 and the branch station 3 are land stations. The submarine branching apparatus 90 is installed on a seabed. The trunk stations 1, 2 and the branch station 3 are connected with the submarine branching apparatus 90 by submarine cables 51 to 53, respectively. The submarine cables 51 to 53 respectively include submarine repeaters 41 to 43 installed at certain intervals for amplifying transmitted signals and include transmission lines for transmitting signals and feed lines for supplying power to the submarine repeaters 41 to 43 and other apparatuses installed on the seabed. In many cases, metal conductor is used for the feed lines of the submarine cables 51 to 53 and optical fiber is used for the transmission lines.

The submarine branching apparatus 90 includes a branching unit 94. The branching unit 94 has a function for switching feed lines of the submarine cables 51 to 53 and a function for connecting the feed lines of the submarine cables 51 to 53 to sea earth for grounding. The submarine cable system 900 also includes a function for switching paths of transmitted signals. In the following, the function of the submarine cable system 900 for switching feed lines will be described.

The trunk station 1 illustrated in FIG. 6 has a constant current source of a positive voltage (positive supply) while the trunk station 2 has a constant current source of a negative voltage (negative supply). The feed current A from the trunk station 1 flows through the submarine cable 51, the submarine branching apparatus 90, and the submarine cable 52 to the trunk station 2. The branch station 3 is a constant current source of a positive voltage (positive supply), and the feed current B from the branch station 3 flows from the branch station 3 through the submarine cable 53 toward the submarine branching apparatus 90, and at the branching unit 94 the feed line is connected to sea earth.

FIG. 7 is a block diagram illustrating the feed lines in the case when the submarine cable 51 of the submarine cable system 900 in FIG. 6 is cut off at the position denoted by X. Upon detecting the fault in the submarine cable 51, the branching unit 94 connects the end of the submarine cable 51 connected with the submarine branching apparatus 90 to sea earth. The branching unit 94 connects the feed line of the submarine cable 52 with the feed line of the submarine cable 53. As a result, the feed current from the branch station 3 flows through the submarine cable 53, the submarine branching apparatus 90, and the submarine cable 52 to the trunk station 2. Since the trunk station 2 and the branch station 3 supply power by constant current, the feed current B from the branch station 3 needs to be equal to the feed current A from the trunk station 2 in the feed lines illustrated in FIG. 7. Supplying power to the submarine cables 52, 53 allows communication between the trunk station 2 and the branch station 3 to be maintained.

In relation to the present invention, Patent Literature 1 and Patent Literature 2 describe techniques for switching feed lines.

CITATION LIST

Patent Literature

[PTL 1] Published Japanese Translation of PCT International Application Publication No. 11-510350
[PTL 2] Japanese Unexamined Patent Application Publication No. 09-181654

SUMMARY OF INVENTION

Technical Problem

As has been described with reference to FIG. 6 and FIG. 7, when a fault in the submarine cable 51 brings about a need for switching feed lines in the submarine cable system 900, the submarine branching apparatus 90 connects the feed lines of the submarine cables 52 and 53, which were not connected until then. As a result of this, a new feed line between the trunk station 2 and the branch station 3 is established. This entails that all feed lines having a possibility of being connected need to have an equal feed current. In FIG. 7, the feed current B of the branch station 3 needs to be equal to the feed current A. Thus, when a submarine branching apparatus 90, a branch station 3, and a submarine cable 53 are to be additionally installed to an existing submarine cable system in which the trunk stations 1, 2 are connected, the specifications for feed current of the branch station 3 need to match the specifications for feed current of the trunk stations 1, 2. Such a restriction on the power supply specifications makes it difficult to additionally install submarine cables and increases the cost for designing the power supply circuits. Patent Literature 1 and 2 describe techniques for switching feed lines but they do not mention a measure to deal with a problem of this kind that accompanies additional installation of submarine cables.

Object of Invention

An object of the present invention is to provide a technique for solving the problem of difficulty in additionally installing cables and cost increase due to the restriction on feed current.

Solution to Problem

A feed line branching apparatus of the present invention is a feed line branching apparatus coupled with a first terminal station, a second terminal station, and a third terminal station respectively via a first cable, a second cable, and a third cable, the terminal stations each including a function for supplying power for a cable from a constant current source, the feed line branching apparatus including: a branching means for, when the first and the second cables are in a normal state, establishing a feed line of a first electric current between the first terminal station and the second terminal station by coupling a feed line of the first cable with a feed line of the second cable, and for, when a fault has occurred in one of the first and the second cables, grounding the feed line of the one of the cables and for coupling the feed line of the other of the first and the second cables to a grounding means; and the grounding means for establishing a feed line of a second electric current between the third terminal station and the grounding means by grounding a feed line of the third cable and for, when the feed line of the other cable from the branching means is coupled to the grounding means, establishing a feed line of the first electric current between the first or the second terminal station coupled with the other cable and the grounding means by grounding the feed line of the other cable.

A feed line branching method of the present invention is a feed line branching method used in a feed line branching apparatus coupled with a first terminal station, a second terminal station, and a third terminal station respectively via a first cable, a second cable, and a third cable, the terminal stations each including a function for supplying power from a constant current source, the method including: establishing, by grounding a feed line of the third cable, a feed line of a second electric current between the third terminal station and a ground point of the feed line of the third cable; when the first and the second cables are in a normal state, establishing a feed line of a first electric current between the first terminal station and the second terminal station by coupling a feed line of the first cable with a feed line of the second cable; and when a fault has occurred in one of the first and the second cables, grounding the feed line of the one of the cables and grounding the feed line of the other of the first and the second cables to establish a feed line of the first electric current between the first or second terminal station coupled with the other cable and a ground point of the feed line of the other cable.

A storage medium storing a control program of the present invention is a non-transitory storage medium storing a control program for a feed line branching apparatus coupled with a first terminal station, a second terminal station, and a third terminal station respectively via a first cable, a second cable, and a third cable, the terminal stations each comprising a function for supplying power from a constant current source, wherein the control program causes a computer of the feed line branching apparatus to execute: a procedure of establishing, by grounding a feed line of the third cable, a feed line of a second electric current between the third terminal station and a ground point of the feed line of the third cable; a procedure of, when the first and the second cables are in a normal state, establishing a feed line of a first electric current between the first terminal station and the second terminal station by coupling a feed line of the first cable with a feed line of the second cable; and a procedure of, when a fault has occurred in one of the first and the second cables, grounding the feed line of the one of the cables and grounding the feed line of the other of the first and the second cables to establish a feed line of the first electric current between the first or second terminal station coupled with the other cable and a ground point of the feed line of the other cable.

Advantageous Effects of Invention

The present invention provides a feed line branching apparatus and a feed line branching method that allow easy installation of additional cables and curb cost increase.

DESCRIPTION OF EMBODIMENTS (First Example Embodiment)

Figure 1:
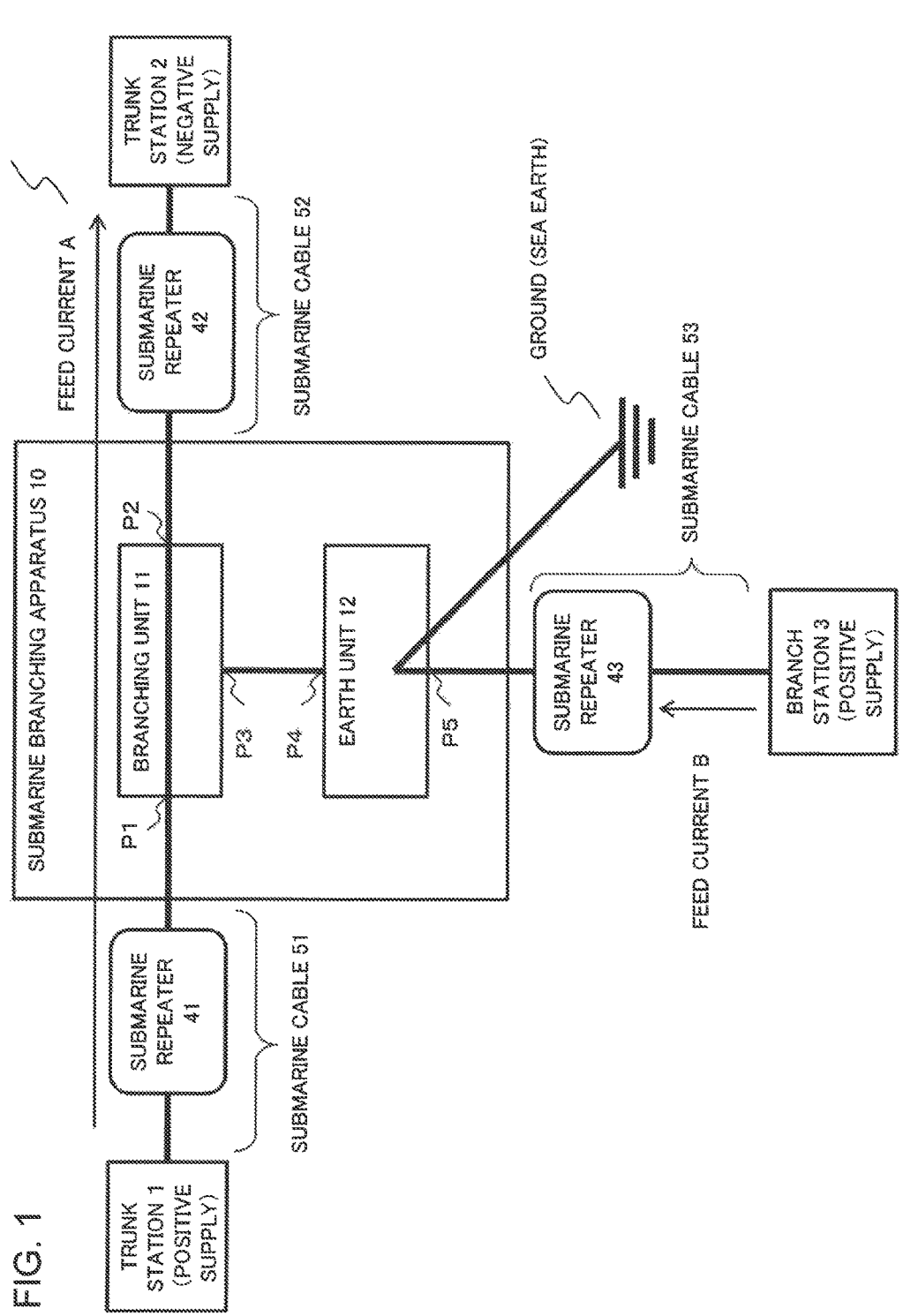
FIG. 1 is a block diagram illustrating a configuration of a submarine cable system according to a first example embodiment.

FIG. 1 is a block diagram illustrating a configuration of a submarine cable system 100 according to a first example embodiment of the present invention. The submarine cable system 100 includes a trunk station 1, a trunk station 2, a branch station 3, and a submarine branching apparatus 10. The trunk stations 1, 2 and the branch station 3 are land stations. The trunk stations 1, 2 and the branch station 3 are coupled with the submarine branching apparatus 10 respectively by submarine cables 51 to 53. The submarine cables 51 to 53 respectively include submarine repeaters 41 to 43 installed at certain intervals for amplifying transmitted signals. The submarine cables 51 to 53 include transmission lines for transmitting signals and feed lines for supplying power to the submarine repeaters 41 to 43 and other apparatuses installed on the seabed. The feed currents from the trunk stations 1, 2 and the branch station 3 supply power to the submarine repeater 41 to 43. Metal conductor is mainly used for the feed lines of the submarine cables 51 to 53. Optical fiber may be used for the transmission lines. In the drawings for the example embodiments, the arrows are used to indicate the directions of currents as being described herein and are not intended to indicate any limitations on the directions of currents.

The submarine branching apparatus 10 is installed underwater including on a seabed, and switches feed lines and transmission lines between a plurality of submarine cables. The submarine branching apparatus 10 includes a branching unit 11 and an earth unit 12. The branching unit 11 includes ports P1 to P3, to which feed lines are connected, and is provided with a function for switching feed lines connected to the ports. The feed line of the submarine cable 51 is connected to the port P1, and the feed line of the submarine cable 52 is connected to the port P2. The branching unit 11 is capable of grounding the feed lines connected to the ports by individually coupling them to sea earth. The earth unit 12 includes ports P4, P5, to which feed lines are connected. The port P4 of the earth unit 12 is coupled with the port P3 of the branching unit 11. The feed line of the submarine cable 53 is connected to the port P5. The earth unit 12 is also capable of grounding the feed lines connected to the ports by individually connecting them to sea earth.

In the following, description will be made of switching feed lines in the submarine cable system 100. The submarine branching apparatus 10 also has a repeating function and a switching function for the signal transmission lines between the trunk stations 1, 2, and the branch station 3. However, since the repeating function and the switching function for transmission lines of submarine branching apparatuses are known functions, these functions for signal transmission lines will not be described in detail.

In FIG. 1, the trunk station 1 and the branch station 3 are constant current sources of positive voltages (positive supply), and the trunk station 2 is a constant current source of a negative voltage (negative supply). A feed current A flows from the trunk station 1 through the submarine cable 51 including the submarine repeater 41, the port P1 and the port P2 of the branching unit 11, and the submarine cable 52 including the submarine repeater 42 to the trunk station 2. Since the branch station 3 is a constant current source of a positive voltage (positive supply), a feed current B from the branch station 3 flows from the branch station 3 through the submarine cable 53 toward the submarine branching apparatus 10. The feed line of the submarine cable 53 is inputted to the port P5 of the earth unit 12 and connected to sea earth. In FIG. 1, the port P3 is connected with the port P4 while the feed line between the trunk stations 1 and 2 is insulated from the feed line extending from the branch station 3 through the earth unit 12 to sea earth.

Figure 2:
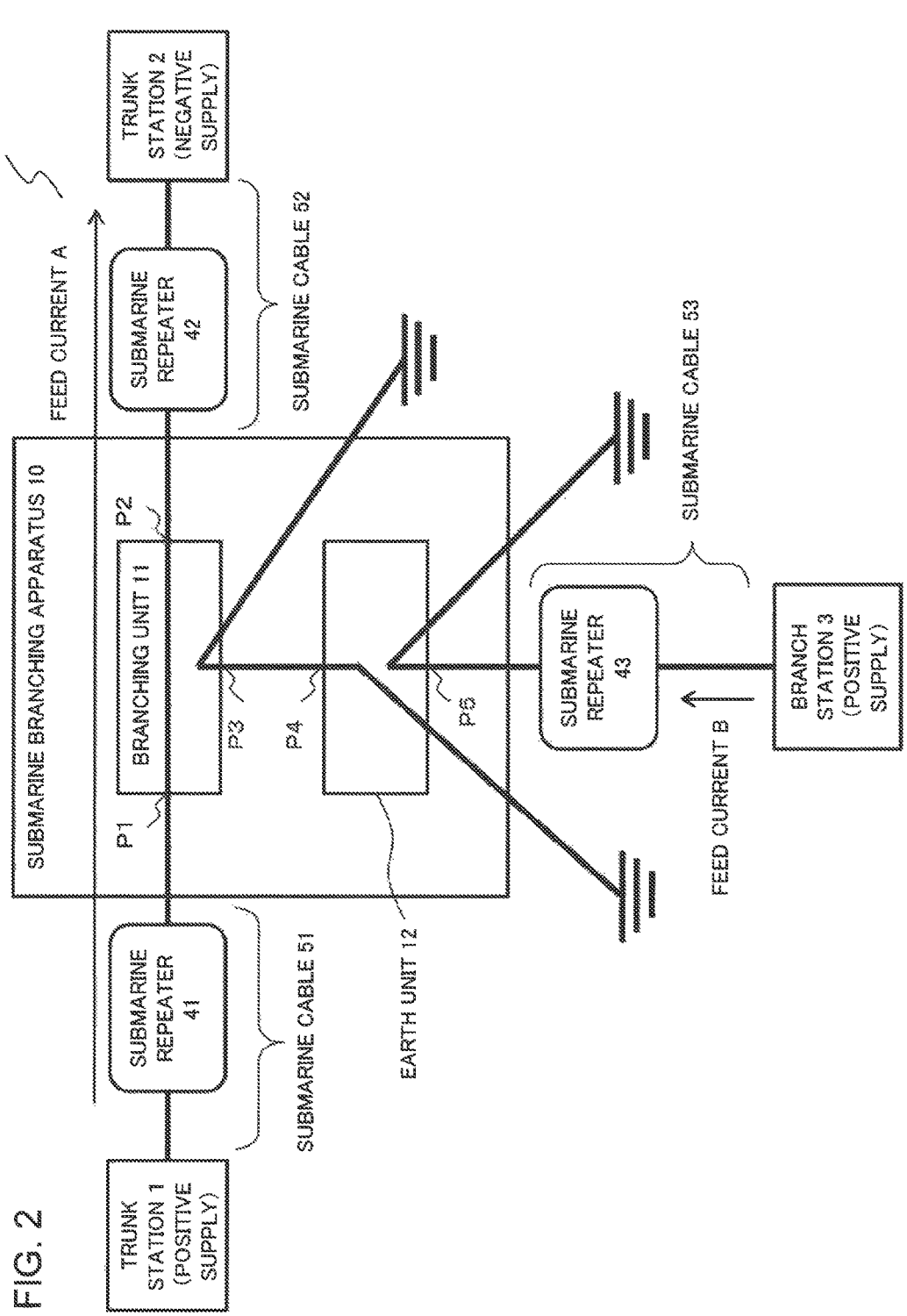
FIG. 2 is a block diagram illustrating an example of feed lines in a normal state of the submarine cable system according to the first example embodiment.

FIG. 2 is a block diagram illustrating an example of feed lines in a normal state of a submarine cable system 100. The feed line of the submarine cable 53 is coupled to sea earth while insulated from the feed line between the trunk stations 1 and 2. Since the feed line extending from the branch station 3 is coupled to sea earth via the earth unit 12, a single-end feed by the positive potential (+) from the branch station 3 to the submarine cable 53 is possible. Here, the feed current B from the branch station 3 need not be equal to the feed current A between trunk stations 1 and 2. In other words, in the configuration illustrated in FIG. 2, the branch station 3 and the submarine cable 53 can be operated with a feed current not equal to the feed current between the trunk stations 1 and 2. In FIG. 2, the port P3 of the branching unit 11 and the port P4 of the earth unit 12 are connected with each other, and coupled to sea earth via respective units.

Figure 3:
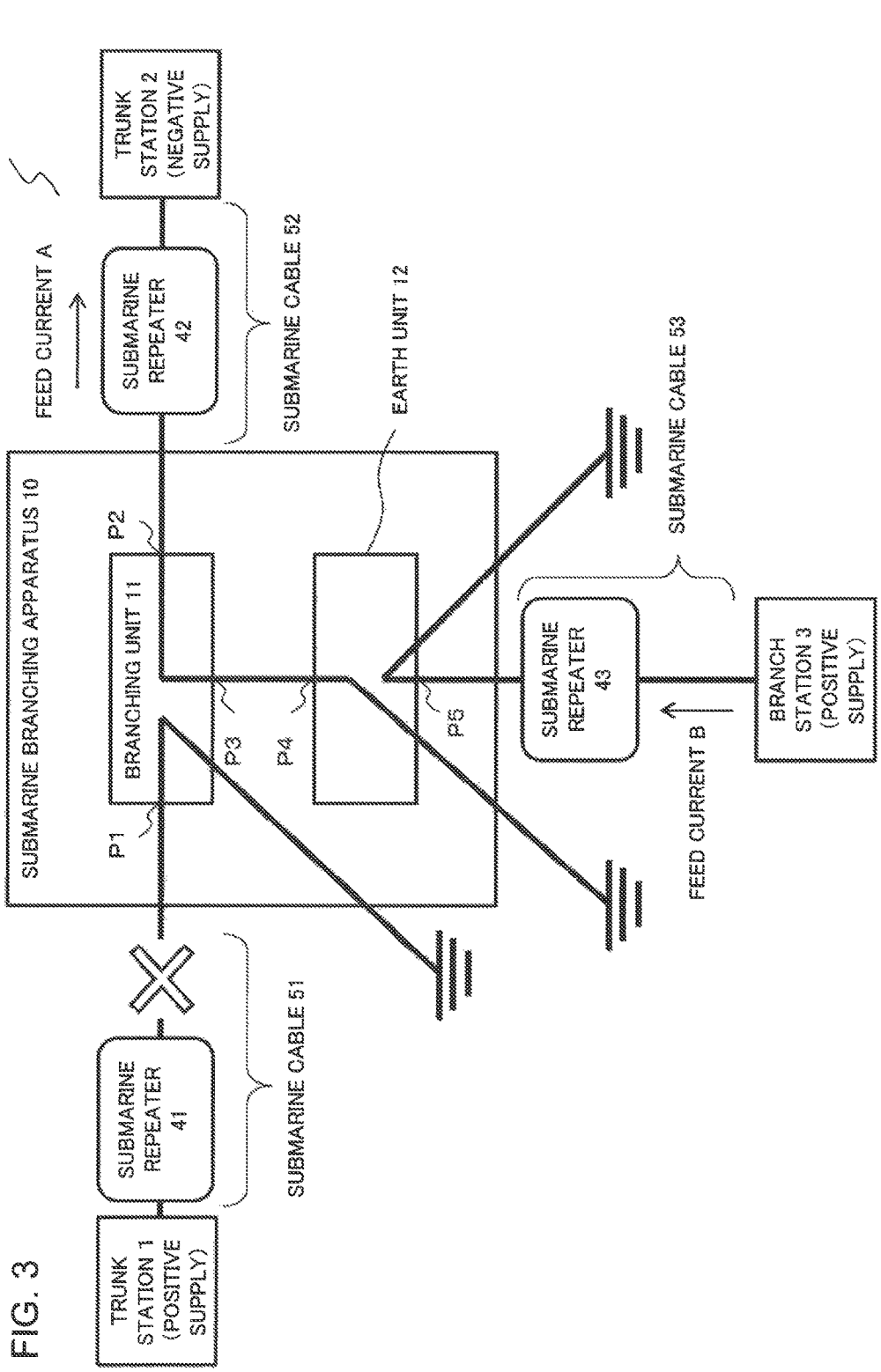
FIG. 3 is a block diagram illustrating an example in which a feed line has been switched to another route when a fault has occurred in a submarine cable.

FIG. 3 is a block diagram illustrating an example in which a feed line has been switched to another route when a fault has occurred at a point X in a submarine cable 51. When a fault has occurred in the submarine cable 51, the submarine branching apparatus 10 controls the branching unit 11 in such a way as to connect the feed line from the trunk station 1 connected to the port P1 of the branching unit 11, to sea earth. This separates the feed line of the submarine cable 51 from the other submarine cables and allows a repair work on the submarine cable 51. The submarine branching apparatus 10 further controls the branching unit 11 and the earth unit 12 in such a way as to couple the feed line of the submarine cable 52 connected to the port P2 of the branching unit 11, to sea earth by way of the earth unit 12 via the port P3 of the branching unit 11 and the port P4 of the earth unit 12. These connections allow a single-end feed from the trunk station 2 to the submarine cable 52. The power to the submarine cable 52 is supplied by the same feed current A as when the feed line existed between the trunk station 1 and the trunk station 2. The feed line of the submarine cable 53, connected with the branch station 3, is not coupled with the feed line of submarine cables 51, 52 but coupled to sea earth via earth unit 12 as in FIG. 1 and FIG. 2.

In FIG. 3, the feed line extending from the trunk station 2 through the branching unit 11 and the earth unit 12 to sea earth is insulated from the feed line extending from the branch station 3 through the earth unit 12 to sea earth. Therefore, the feed current B of the branch station 3 need not be equal to the feed current A of the trunk station 2. In other words, even after a feed line has been switched to another route due to a fault in the submarine cable 51, the submarine cable 53 can continue to be operated by the feed current B, which is different from the feed current of the submarine cable 52. With the configuration illustrated in FIG. 3, even when a fault has occurred in the submarine cable 51, power supplies to the submarine cables 52 and 53, in which no fault has occurred, are maintained, and the communication between the trunk station 2 and the branch station 3 is also maintained.

In other words, the submarine cable system 100 allows the branch station 3 and the submarine cable 53 designed for the feed current B, which is different from the feed current A of the trunk stations 1, 2, to be used alongside with the trunk stations 1, 2 in the submarine cable system 100.

Figure 4:
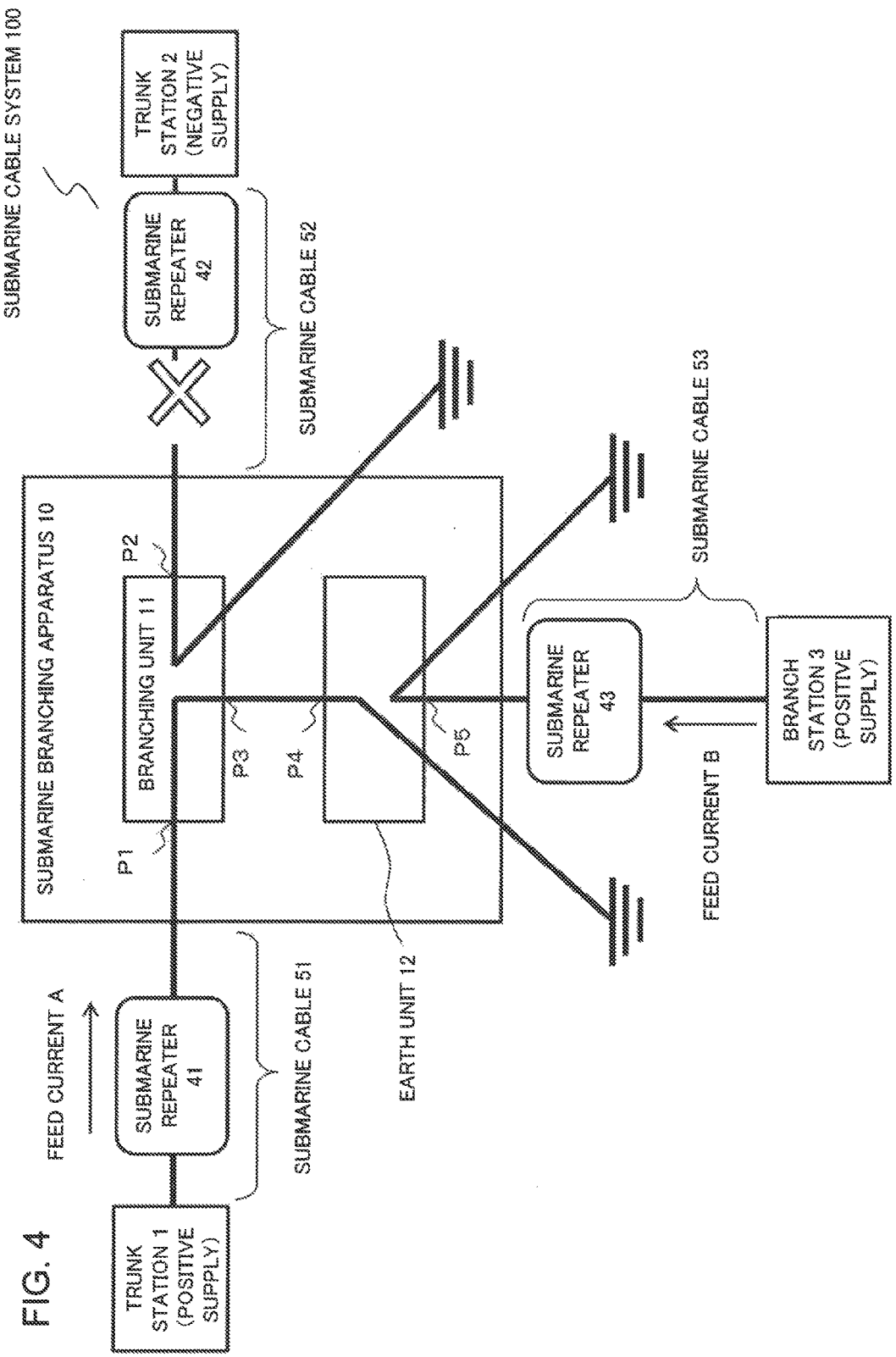
FIG. 4 is a block diagram illustrating an example in which a feed line has been switched to another route when a fault has occurred in a submarine cable.

FIG. 4 is a block diagram illustrating an example in which a feed line has been switched to another route when a fault has occurred at a point X in the submarine cable 52. When a fault has occurred in the submarine cable 52, the submarine branching apparatus 10 controls the branching unit 11 in such a way as to couple the feed line from the trunk station 2 connected to the port P2 of the branching unit 11, to sea earth. This separates the feed line of the submarine cable 52 from the other submarine cables and allows a repair work on the submarine cable 52. The submarine branching apparatus 10 further controls the branching unit 11 and the earth unit 12 in such a way as to couple the feed line of the submarine cable 51 connected to the port P1 of the branching unit 11, to sea earth by way of the earth unit 12 via the port P3 of the branching unit 11 and the port P4 of the earth unit 12. These connections allow a single-end feed from the trunk station 1 to the submarine cable 51. The power to the submarine cable 51 is supplied by the same feed current A as when the feed line existed between the trunk station 1 and the trunk station 2. The feed line of the submarine cable 53, connected with the branch station 3, is not coupled with the feed line of submarine cables 51, 52 but coupled to sea earth via earth unit 12 similarly to FIGS. 1 to 3.

In FIG. 4, the feed line extending from the trunk station 1 through the branching unit 11 and the earth unit 12 to sea earth is insulated from the feed line extending from the branch station 3 through the earth unit 12 to sea earth. Therefore, the feed current B of the branch station 3 need not be equal to the feed current A of the trunk station 1. In other words, even after a feed line has been switched to another route due to a fault in the submarine cable 52, the submarine cable 53 can continue to be operated by the feed current B, which is different from the feed current of the submarine cable 51. With the configuration illustrated in FIG. 4, even when a fault has occurred in the submarine cable 52, power supplies to the submarine cables 51 and 53, in which no fault has occurred, are maintained, and the communication between the trunk station 1 and the branch station 3 is also maintained.

In other words, similarly to the configuration illustrated in FIG. 3, the configuration illustrated in FIG. 4 of the submarine cable system 100 allows the branch station 3 and the submarine cable 53 designed for the feed current B, which is different from the feed current A of the trunk stations 1, 2, to be used alongside with the trunk stations 1, 2 in the system.

Figure 5:
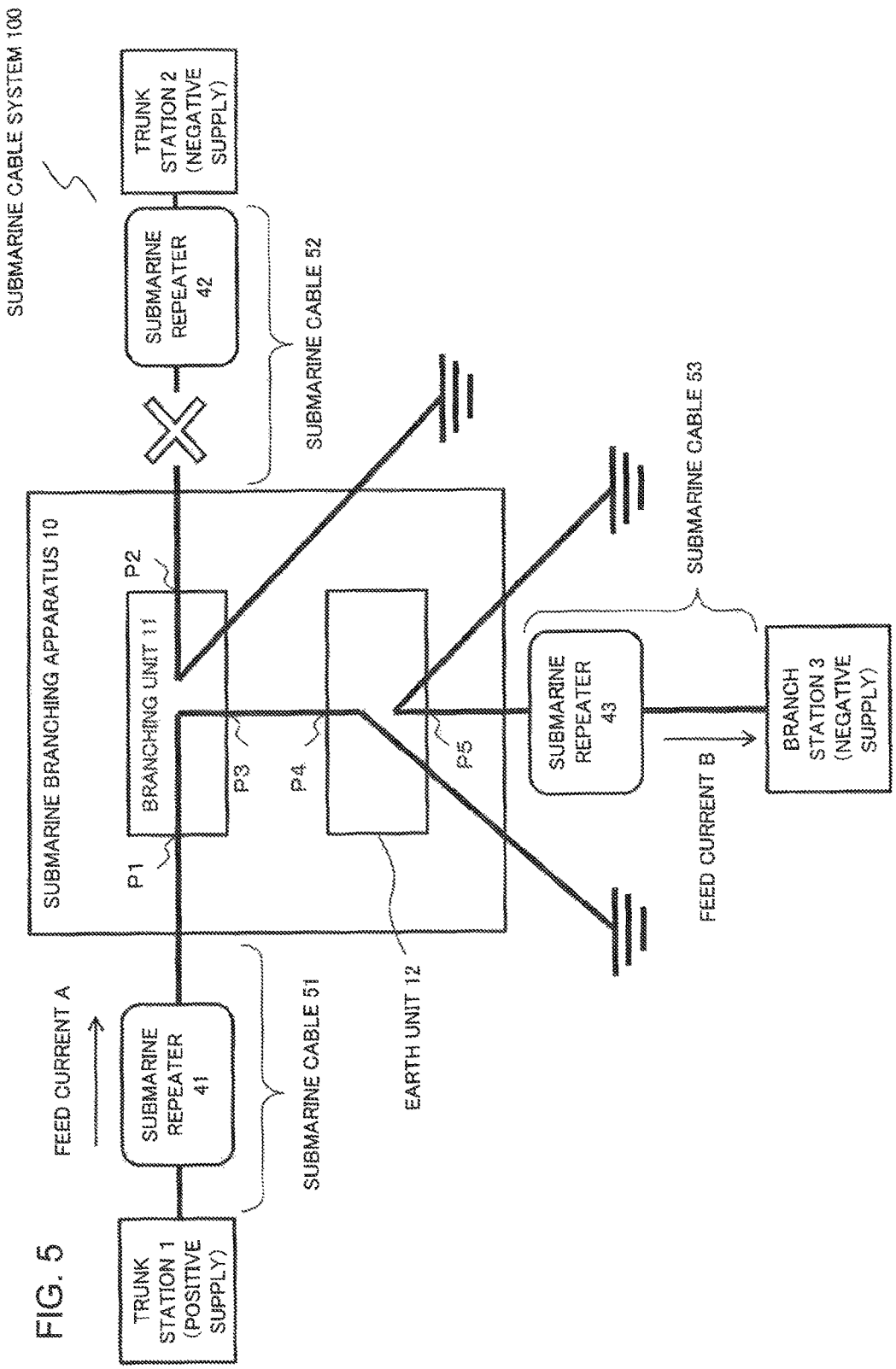
FIG. 5 is a block diagram illustrating an example in which a feed line has been switched to another route when a fault has occurred in a submarine cable.
Figure 6:
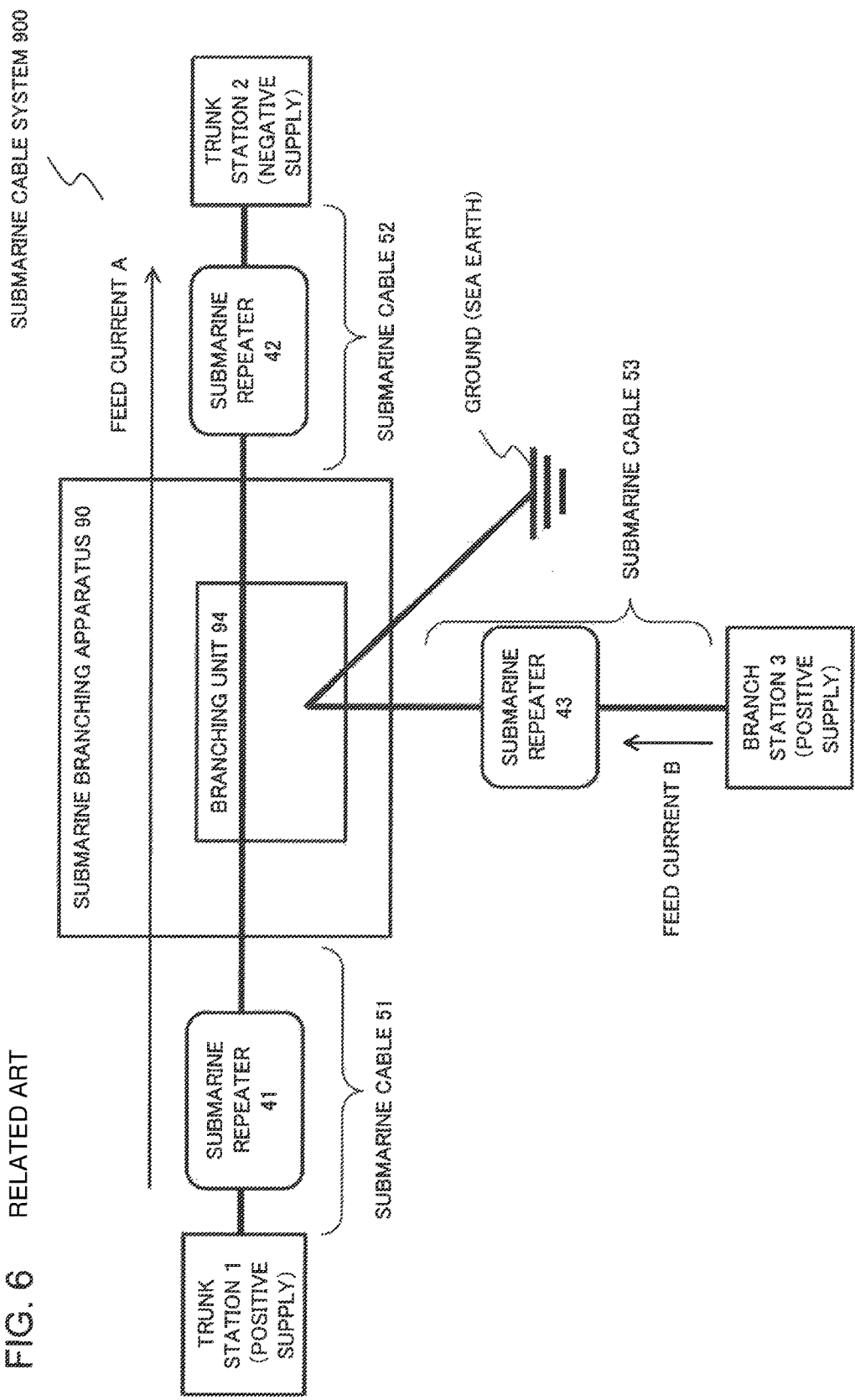
FIG. 6 is a block diagram illustrating a configuration of a common submarine cable system.
Figure 7:
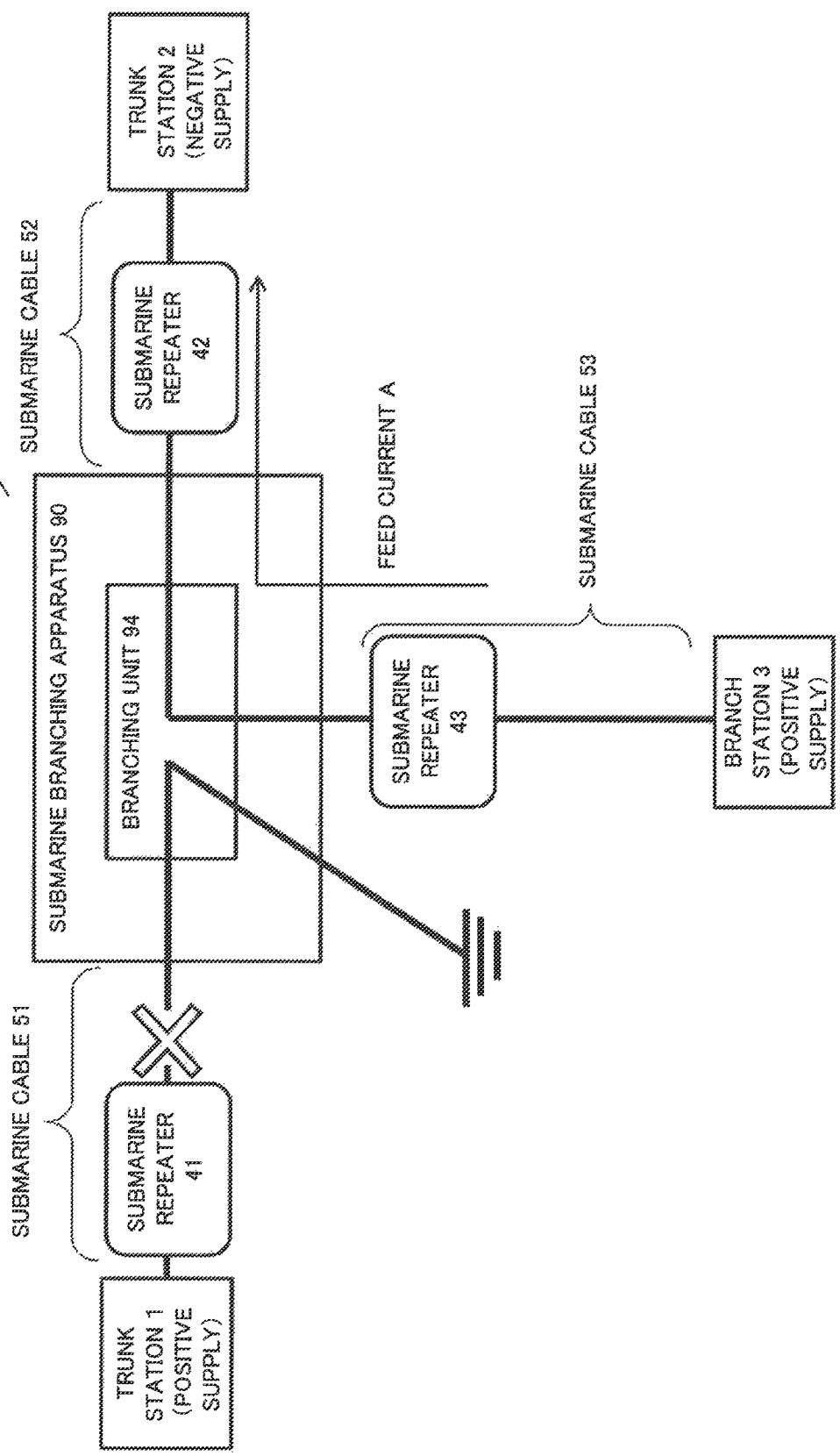
FIG. 7 is a block diagram illustrating feed lines in a case when there is a cut-off in a submarine cable of a common submarine cable system.

FIG. 5 is a block diagram illustrating an example in which a feed line has been switched to another route when a fault has occurred at a point X in the submarine cable 52, similarly to FIG. 4. The configuration illustrated in FIG. 5 differs from the configuration illustrated in FIG. 4 in that the branch station 3 is a constant current source of a negative voltage (negative supply). As described with reference to FIGS. 1 to 4, since the feed line of the submarine cables 51, 52 is independent from the feed line of the submarine cable 53, the polarity of the power source of the branch station 3 and the electric current therefrom/thereto may be designed independently from the polarities of the power sources of the trunk stations 1, 2 and electric current therefrom/thereto.

As described above, the submarine cable system 100 according to the present example embodiment operates the branch station 3 and the submarine cable 53 connected with the branch station 3 using a feed line independent from the feed line of the trunk stations 1, 2. As a result, when a branch station 3 and a submarine cable 53 are to be additionally installed to a system including the trunk stations 1, 2 and the submarine cables 51, 52 only, the specifications for the feed current from/to the branch station 3 need not match the specifications for the feed current between the trunk stations 1 and 2.

The submarine cable system 100 allows the branch station 3 and the submarine cable 53 designed for the feed current B, which is different from the feed current A of the trunk stations 1, 2, to be used alongside with the trunk stations 1, 2 in the system, even when a feed line has been switched to another route as illustrated in FIGS. 3 to 5.

For example, when a submarine branching apparatus and a submarine cable are to be additionally installed to a submarine cable system made by another company, it has been necessary to design the equipment to be additionally installed in such a way that the equipment will be operable with the feed current of the existing submarine cable system. However, the submarine branching apparatus described with respect to the present example embodiment eliminates, by providing an earth unit, the need for any design changes for making the feed current of the submarine cable to be additionally installed match the feed current of the existing system. In other words, the submarine cable system according to the first example embodiment has advantageous effects of allowing easy installation of additional cables and curbing cost increase associated with the additional installation.

(Second Example Embodiment)

The configuration of the submarine branching apparatus 10 as has been described according to the first example embodiment is not limited in its application to the submarine cable system 100 but can be applied widely to common cable communication systems. In other words, the advantageous effects of the first example embodiment may be obtained also with a feed line branching apparatus according to a second example embodiment as will be described below. The feed line branching apparatus according to the second example embodiment is an apparatus that corresponds to the submarine branching apparatus 10 according to the first example embodiment. In the following, the configuration of the feed line branching apparatus according to the second example embodiment will be described, with reference numerals in brackets denoting the corresponding elements in FIG. 1.

The feed line branching apparatus (10) according to the second example embodiment is a feed line branching apparatus (10) coupled with a first terminal station (1), a second terminal station (2), and a third terminal station (3) respectively via a first cable (51), a second cable (52), and a third cable (53), the terminal stations each including a function for supplying power for a cable from a constant current source. The feed line branching apparatus (10) includes a branching unit (11) and an earth unit (12).

When the first and the second cables (51, 52) are in a normal state, the branching unit (11) establishes a feed line of a first electric current (A) between a first terminal station (1) and a second terminal station (2) by coupling a feed line of the first cable and a feed line of the second cable. When a fault has occurred in one of the first and the second cables (51 or 52), the branching unit (11) grounds the feed line of the one of the cables and couples the feed line of the other of the first and the second cables (52 or 51) to an earth unit (12).

The earth unit (12) establishes a feed line of a second electric current (B) between the third terminal station (3) and the earth unit (12) by grounding the feed line of the third cable (53). When the feed line of the other cable (52 or 51) from the branching unit (11) is coupled to the earth unit (12), the earth unit (12) grounds the feed line. Grounding the feed line of the other cable (52 or 51) establishes a feed line of the first electric current (A) between the first or the second terminal station (1 or 2) coupled with the other cable (52 or 51) and the earth unit (12)

A feed line branching apparatus having such a configuration eliminates, by providing an earth unit, the need for any design changes for making the feed current of the cable to be additionally installed match the feed current of the existing system. In other words, the feed line branching apparatus according to the present example embodiment also has advantageous effects of allowing easy installation of additional cables and curbing cost increase associated with the additional installation.

Furthermore, the submarine branching apparatus and the feed line branching apparatus according to the respective example embodiments may include a Central Processing Unit (CPU) and a storage device. The CPU and the storage device may be included in any element of the submarine branching apparatus and the feed line branching apparatus. The branching unit may include the CPU and the storage device. The CPU executes a program stored in the storage device and thereby causes the submarine branching apparatus and the feed line branching apparatus according to the respective example embodiments to carry out their functions. The storage device is a fixed non-transitory storage medium. The storage medium may be a semiconductor memory or a fixed magnetic disk but is not limited to these.

The present invention has been described with reference to the example embodiments, but the present invention is not limited to the above-described example embodiments. Various changes that those skilled in the art will understand can be made to the configurations and details of the present invention without departing from the scope of the present invention.

This application claims priority based on the Japanese Patent Application No. 2014-249983 filed Dec. 10, 2014, the disclosure of which is incorporated herein by reference in its entirety.

INDUSTRIAL APPLICABILITY

The submarine branching apparatus and the feed line branching apparatus described with reference to the example embodiments are particularly suitable to application for a submarine cable system employing many submarine branching apparatuses, for example, a system for connecting islands. The above-described submarine branching apparatus and the feed line branching apparatus allow installation of equipment designed for a feed current different from the feed current of the existing submarine cable system and facilitate expansion of the submarine cable system.

REFERENCE SIGNS LIST 100, 900 submarine cable system
1, 2 trunk station
3 branch station
10, 90 submarine branching apparatus
11, 94 branching unit
12 earth unit
41 to 43 submarine repeater
51 to 53 submarine cable

The invention claimed is:

1. A computer-implemented feed line branching apparatus supplied with power from a first terminal station, a second terminal station, and a third terminal station via a first cable, a second cable, and a third cable, respectively, the computer-implemented feed line branching apparatus comprising:
a processor; and
a memory storing instructions to be executed by the processor by causing the processor to execute functions of:
a branching unit that is coupled with the first and second terminal stations via the first and second cables respectively and couples a feed line of the first cable with a feed line of the second cable in a normal state; and
an earthing unit coupled with the third terminal station via the third cable configured to ground a feed line of the third cable in the normal state,
wherein
the branching unit includes a first port, a second port and a third port,
the earthing unit includes a fourth port and a fifth port,
the first cable is coupled to the first port, the second cable is coupled to the second port and the third cable is coupled to the fifth port,
the branching unit grounds, based on a fault in the first cable, the feed line of the first cable and couples the feed line of the second cable with the earthing unit through the third port and the fourth port, and
the earthing unit grounds, based on the fault in the first cable, the feed line of the second cable coupled with the fourth port of the earthing unit.

2. The computer implemented feed line branching apparatus according to claim 1, wherein the branching unit and the earthing unit are different.

3. The computer implemented feed line branching apparatus according to claim 1, wherein the first, second, and third cables are submarine cables, the computer implemented feed line branching apparatus is a submarine branching apparatus installed on a seabed, the first, second, and third terminal stations are land stations, and the earthing unit grounds the feed lines to sea earth.

4. The computer implemented feed line branching apparatus according to claim 2, wherein the first, second, and third cables are submarine cables, the computer implemented feed line branching apparatus is a submarine branching apparatus installed on a seabed, the first, second, and third terminal stations are land stations, and the earthing unit grounds the feed lines to sea earth.

5. A feed line branching method used in a feed line branching apparatus supplied with power from a first terminal station, a second terminal station, and a third terminal station via a first cable, a second cable, and a third cable, respectively, the method comprising:
coupling a feed line of the first cable with a feed line of the second cable in a normal state;
grounding a feed line of the third cable in the normal state;
based on a fault in the first cable, grounding the feed line of the first cable and coupling the feed line of the second cable with an earthing unit included in the feed line branching apparatus; and
based on the fault in the first cable, grounding, by the earthing unit, the feed line of the second cable, wherein
the earthing unit includes a first port and a second port,
in the normal state, the third cable is coupled to the second port and the feed line of the third cable is grounded, and
based on the fault in the first cable, the feed line of the second cable is grounded through the first port.

6. A non-transitory storage medium storing a control program for a feed line branching apparatus supplied with power from a first terminal station, a second terminal station, and a third terminal station via a first cable, a second cable, and a third cable, respectively, wherein the control program causes a computer of the feed line branching apparatus to execute:
a procedure of coupling a feed line of the first cable with a feed line of the second cable in a normal state;
a procedure of grounding a feed line of the third cable in the normal state;
a procedure of, based on a fault in the first cable, grounding the feed line of the first cable and coupling the feed line of the second cable with an earthing unit included in the feed line branching apparatus; and
a procedure of, based on the fault in the first cable, grounding, by the earthing unit, the feed line of the second cable, wherein
the earthing unit includes a first port and a second port,
in the normal state, the third cable is coupled to the second port and the feed line of the third cable is grounded, and
based on the fault in the first cable, the feed line of the second cable is grounded through the first port.

7. A cable system comprising:
a first terminal station, a second terminal station, and a third terminal station each supplying power from a constant current source, and
a computer-implemented feed line branching apparatus supplied with power from the first terminal station, the second terminal station, and the third station via a first cable, a second cable, and a third cable, respectively,
wherein
the computer-implemented feed line branching apparatus comprises:
a processor; and
a memory storing instructions to be executed by the processor by causing the processor to execute functions of:
a branching unit that is coupled with the first and second terminal stations via the first and second cables respectively and couples a feed line of the first cable with a feed line of the second cable in a normal state; and an earthing unit coupled with the third terminal station via the third cable configured to ground a feed line of the third cable in the normal state, and wherein the branching unit includes a first port, a second port and a third port, the earthing unit includes a fourth port and a fifth port, the first cable is coupled to the first port, the second cable is coupled to the second port and the third cable is coupled to the fifth port, the branching unit grounds, based on a fault in the first cable, the feed line of the first cable and couples the feed line of the second cable with the earthing unit through the third port and the fourth port, and the earthing unit grounds, based on the fault in the first cable, the feed line of the second cable coupled with the fourth port of the earthing unit.

8. A cable system according to claim 7,
wherein
the branching unit and the earthing unit are different units.

9. A cable system according to claim 7,
wherein
the first, second, and third cables are submarine cables, the computer implemented feed line branching apparatus is a submarine branching apparatus installed on a seabed, the first, second, and third terminal stations are land stations, and the earthing unit grounds the feed lines to sea earth.

10. A cable system according to claim 8,
wherein
the first, second, and third cables are submarine cables, the computer implemented feed line branching apparatus is a submarine branching apparatus installed on a seabed, the first, second, and third terminal stations are land stations, and the earthing unit grounds the feed lines to sea earth.

* * * * *